(12) United States Patent
Yokota et al.

(10) Patent No.: US 6,398,669 B1
(45) Date of Patent: Jun. 4, 2002

(54) PAINTED GOLF BALL

(75) Inventors: Masatoshi Yokota, Akashi; Kiyoto Maruoka, Kobe; Kaichiro Wayaku, Amagasaki, all of (JP)

(73) Assignees: Sumitomo Rubber Industries, Ltd.; Wayaku Paint Co., Ltd., both of Hyogo (JP)

( * ) Notice: Subject to any disclaimer, the term of this patent is extended or adjusted under 35 U.S.C. 154(b) by 0 days.

(21) Appl. No.: 09/570,188

(22) Filed: May 12, 2000

(30) Foreign Application Priority Data

May 14, 1999 (JP) .............................. 11-134373

(51) Int. Cl.$^7$ .................. A63B 37/12; A63B 37/14; C08B 77/26
(52) U.S. Cl. ......................... 473/378; 528/318
(58) Field of Search ................. 473/351, 365, 473/377, 378; 427/219, 222; 525/7.2, 124, 101, 474, 504; 523/142, 209, 21 B, 201, 433; 524/265, 99, 588

(56) References Cited

U.S. PATENT DOCUMENTS

| | | | | |
|---|---|---|---|---|
| 2,721,854 A | * | 10/1955 | Kohl | 525/7.2 |
| 2,827,474 A | * | 3/1958 | Krees | 525/7.2 |
| 2,877,202 A | * | 3/1959 | Olson | 525/7.2 |
| 4,120,837 A | * | 10/1978 | Schafer et al. | 525/7.2 |
| 5,491,203 A | * | 2/1996 | Matsui et al. | 525/474 |
| 5,492,968 A | * | 2/1996 | Nakai et al. | 525/101 |
| 5,539,051 A | * | 7/1996 | Satou et al. | 523/201 |
| 5,725,443 A | | 3/1998 | Sugimoto et al. | |
| 5,773,497 A | * | 6/1998 | Ueyanagi et al. | 524/99 |
| 5,783,644 A | * | 7/1998 | Ando et al. | 525/504 |
| 5,820,491 A | * | 10/1998 | Hatch et al. | 473/378 |
| 5,903,190 A | * | 5/1999 | Embree et al. | 330/151 |
| 5,939,472 A | * | 8/1999 | Ito et al. | 523/433 |
| 6,011,123 A | * | 1/2000 | Kurosawa et al. | 524/284 |
| 6,033,597 A | * | 3/2000 | Yatsuyanagi et al. | 252/182.17 |
| 6,040,361 A | * | 3/2000 | Fujiki et al. | 523/209 |
| 6,121,347 A | * | 9/2000 | Yatsuyanagi et al. | 523/209 |
| 6,142,887 A | * | 11/2000 | Sullivan et al. | 473/374 |
| 6,177,505 B1 | * | 1/2001 | Yatsuyanagi et al. | 523/213 |
| 6,268,440 B1 | * | 7/2001 | Kudo et al. | 524/588 |
| 6,329,460 B1 | * | 12/2001 | Ishikawa et al. | 524/265 |

FOREIGN PATENT DOCUMENTS

| | | |
|---|---|---|
| JP | A5269221 | 10/1993 |
| JP | A8117361 | 5/1996 |

OTHER PUBLICATIONS

Kotz & Purcell, Chemical & Chemical Reactivity, 2$^{nd}$ Edition., Saunders College Publishing, Orlando, Florida, 1991, pp. 1075, 1076, 1141, 1142.*

Callister, Jr., Materials Science and Engineering: An Introduction, 4th Edition., John Wiley & Sons, Inc., New York, New York, 1997, pp. 490–491.*

* cited by examiner

*Primary Examiner*—Jeanette Chapman
*Assistant Examiner*—Alvin A. Hunter
(74) *Attorney, Agent, or Firm*—Birch, Stewart, Kolasch & Birch, LLP

(57) ABSTRACT

In order to improve smoothness and contamination resistance of the surface of a golf ball while impact resistance of a coating film is preserved, a painted golf ball constituted of a body and a coating film formed on the body is fabricated by using urethane resin-based paint, acrylic resin-based paint or epoxy resin-based paint for the coating film, the paint containing modified polysiloxane having at least one hydroxyl or carboxyl group in one end of a polysiloxane chain at a ratio of 0.1 to 10% by weight relative to a resin component of the paint, and the modified polysiloxane having a molecular weight of 700 to 7000.

11 Claims, No Drawings

PAINTED GOLF BALL

BACKGROUND OF THE INVENTION

1. Field of the Invention

The present invention relates to golf balls having a body on which a coating film is formed, and particularly to a painted golf ball having improved smoothness and contamination resistance of the ball surface while maintaining originally intended performances of the coating film.

2. Description of the Background Art

Commercially available golf balls have been manufactured having a body to which paint is applied to form a coating film thereon for the purposes of keeping aesthetic appearance and protecting the ball surface. The coating film formed of the paint is required to have such basic characteristics as impact resistance and wear resistance in order to endure repeated hitting by a golf club.

In general, as a paint material which meets these performances, two-component type urethane resin paint has frequently been employed that is produced by curing polyfunctional isocyanate and polyester polyol in the presence of catalyst. However, conventionally employed paint material for golf balls is relatively flexible and thus elongates well in order to enhance the impact resistance to repeated hitting by a golf club. Therefore, the resultant coating film is soft which increases the coefficient of friction of the ball surface. For example, in a system of collecting and transporting a large number of golf balls which is employed in the golf practice field, the golf balls tend to stick to each other due to the frictional force forming a cluster which clogs the transportation passage. This problem is called blocking.

In order to avoid this blocking, a small amount of silicone oil is added to a coating film component. However, the silicone component does not chemically bond to the coating film component so that the component for providing smoothness to the coating film, which is contained in the coating film, could be released because of repeated hitting or long term use, resulting in impaired smoothness.

According to Japanese Patent Laying-Open No. 5-269221, in an attempt to obtain a golf ball having an excellent smoothness for a long period while retaining impact resistance of the coating film, urethane-based clear paint is employed containing modified polysiloxane with a main chain of molecules partially containing at least one hydroxyl group. In this case, the modified polysiloxane serving to give smoothness to the golf ball surface has the hydroxyl group in the main chain and can thus react with binder resin. However, the modified polysiloxane has a high surface activity and thus readily diffuses throughout the surface. Further, the modified polysiloxane has a characteristic of remaining on the coating film because of its reactivity. Although this characteristic is effective for the smoothness of the surface, unreacted components of the polysiloxane tend to remain. Therefore, when a golf ball is immersed in a washing detergent for removing dirt on the golf ball or the golf ball is exposed to rain water, the unreacted components of the modified polysiloxane containing the hydroxyl group and resin of a relatively small molecular weight (including polysiloxane) diffuse into water, resulting in a considerable damage to the surface smoothness. Since polysiloxane tends to remain on the coating film surface, the effect of the surface smoothness is remarkable at first. However, this effect does not last for a long period of time because those components exposed to water are likely to diffuse into the water.

SUMMARY OF THE INVENTION

One object of the present invention is to provide a golf ball having an excellent smoothness of the ball surface which is maintained over a long period of time, by solving the problems above in the conventional art and especially improving the smoothness of the ball surface while maintaining basic performances such as impact resistance of the coating film.

In order to achieve this object, the inventors of the present invention have thoroughly studied and found that smoothness can be provided to the surface of a golf ball and the effect of the smoothness can be kept for a long period without impairing impact resistance of a coating film, by forming the coating film on the surface of the golf ball using urethane resin-based paint, acrylic resin-based paint, or epoxy resin-based paint which contains modified polysiloxane having at least one hydroxyl group or carboxyl group in one end of a polysiloxane chain.

Specifically, according to the present invention, a painted golf ball is provided which is constituted of a golf ball body and a coating film applied onto the body. The coating film is formed of urethane resin-based paint, acrylic resin-based paint, or epoxy resin-based paint. The paint contains modified polysiloxane of 0.1 to 10% by weight relative to a resin component of the paint. The modified polysiloxane has at least one hydroxyl group or carboxyl group in one end of a polysiloxane chain. The molecular weight of the modified polysiloxane is 700 to 7000.

The foregoing and other objects, features, aspects and advantages of the present invention will become more apparent from the following detailed description of the present invention.

DESCRIPTION OF THE PREFERRED EMBODIMENTS

Modified polysiloxane having at least one hydroxyl group or carboxyl group in one end of a polysiloxane chain, which is employed in the present invention, is represented by a general chemical formula below:

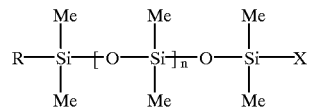

where n represents an integer, R represents alkyl group, Me represents methyl group, and X represents alkyl group having at least one hydroxyl group or carboxyl group in an end carbon. The alkyl group may partially include at least one ether group or ester group. Here, "end" means an end of a main chain which is a chain having at least one hydroxyl group or carboxyl group. The main chain can include a side chain formed of 3 or less carbons.

The number of end hydroxyl groups or end carboxyl groups may be 1 to 3, and preferably 1 or 2. Modified polysiloxane having at least one carboxyl group in one end is commercially available as Silaplane FM-0611, Silaplane FM-0621 and Silaplane FM-0625 which are manufactured by CHISSO CORPORATION. Modified polysiloxane having at least one hydroxyl group in one end is commercially available as Silaplane FM-0411, Silaplane FM-0421, Silaplane FM-0428, Silaplane FM-DA11, Silaplane FM-DA21 and Silaplane-DA25 manufactured by CHISSO CORPORATION.

The modified polysiloxane shown above has at least one hydroxyl group or carboxyl group in one end of a polysiloxane chain to chemically react with the resin component of the paint. Accordingly, the polysiloxane chain is directly grafted to the main chain of the paint and thus can be properly aligned with the polymer main chain of the paint. As a result, there are fewer chances that unreacted polysiloxane remains. Then, washing by water does not cause siloxane to run off and a long-lasting effect is achieved. In particular, modified polysiloxane having two hydroxyl groups in one end is suitable because it is hardly left unreacted.

If a chain of modified polysiloxane has hydroxyl groups or carboxyl groups in both ends, the polysiloxane chain is taken into the main chain of the paint, which adversely influences characteristics of a coating film such as impact resistance. Therefore, such modified polysiloxane is not preferable.

If a chain of modified polysiloxane has at least one hydroxyl group via at least one alkyl group or ester group of a long chain, the portion of the alkyl or ester chain which has the hydroxyl group is bonded to the main chain of resin. In this case, it is difficult to establish alignment of the polysiloxane chain with the main chain of resin and thus there is generated unreacted polysiloxane. In view of this, the polysiloxane is required to have a molecular weight of 7000 or less.

If the molecular weight of polysiloxane is less than 700, the reactivity of polysiloxane with resin is lower. Further, a large amount of polysiloxane should be blended for achieving desired physical properties. In this case, there are many components which do not react with the resin in the paint and accordingly a long-lasting effect cannot be expected. If the molecular weight exceeds 7000, a disadvantage of increased viscosity of siloxane arises in addition to the drawbacks described above. As a result, solubility with respect to the resin in the paint is deteriorated and thus stability of the paint is impaired.

If the percentage by weight of polysiloxane is less than 0.1, the smoothness and the resistance to oil contamination cannot be improved. If the weight percentage thereof exceeds 10, it is impossible to bond polysiloxane entirely to the main chain of the paint and the polysiloxane scatters in the coating film which deteriorates the physical properties of the coating film. Then, adhesibility to an underlayer decreases, the surface is susceptible to damage, and paint which is being applied is repelled. As a result, paint applied to the surface is likely to become uneven.

The modified polysiloxane containing at least one hydroxyl group or carboxyl group in one end is dissolved in xylene, toluene, methyl Cellosolve, butyl acetate and the like. Therefore, the modified polysiloxane can be used as a solution using these as solvent.

According to the present invention, a coating film is formed of urethane resin-based paint, acrylic resin-based paint, or epoxy resin-based paint.

As the urethane resin-based paint, a well-known polyurethane-based paint used for golf balls, for example, two-component type polyurethane paint is suitably used. Specifically, the two-component type polyurethane paint is produced by blending polyol component with polyisocyanate component. As the polyol component, resin of polyol type or polyether polyol type is suitable which is a condensation product of polybasic acid and polyhydric alcohol and modified fatty acid thereof and has several hydroxyl groups. Suitable materials as the isocyanate component are HDI (hexamethylene diisocyanate), TDI (tolylene diisocyanate), IPDI (isophorone diisocyanate), LDI (lysine diisocyanate), LTI (lysine trilsocyanate), $H_{12}$MDI (hydrogenated 4,4'-diphenylmethane diisocyanate), $H_6$XDI (hydrogenated xylene diisocyanate), and adduct, biuret, and isocyanurated resin thereof.

When modified polysiloxane is blended with polyurethane-based paint, particularly two-component type polyurethane paint, the modified polysiloxane is preferably blended with the polyol component, isocyanate component, polyol and isocyanate components, or added simultaneously with blending of both components.

Two-component type polyacrylic-based paint is preferable which is formed of acrylic-based polyol resin having a main chain of acrylic acid and acrylate or methacrylic acid and methacrylate and having several hydroxyl groups in molecules and the isocyanate component as described above. When modified polysiloxane containing at least one isocyanate group is blended, the modified polysiloxane is preferably blended in advance with the polyol component, isocyanate component, polyol and isocyanate components, or added simultaneously with blending of these components before painting.

The epoxy resin-based paint is produced by blending epoxy resin component with polyamine component. As epoxy resin, bisphenol A-based epoxy resin is suitable. As the polyamine component, polyamide resin is suitable.

According to the present invention, any of enamel paint and clear paint may be used as the paint for forming a coating film. If enamel paint is employed, a required pigment, for example, titanium dioxide or the like is blended therewith. If clear paint is employed, although such pigment is not blended, any pigment may be blended as required which does not influence the color of the coating film.

A generally used additive in paint such as anti-foaming agent, levelling agent, slip agent, curing catalyst and fluorescent brightening agent, for example, may be blended with the paint for forming a coating film. It is noted that the amount of blended material is preferably 0.01 to 5% by weight relative to the solid component of the paint.

According to the present invention, solvents which can be used to prepare paint for forming a coating film are: a generally used organic solvent such as aromatic hydrocarbon (e.g. toluene or xylene), ester-based solvent (e.g. ethyl acetate, butyl acetate, methyl acetate), ether-based solvent (e.g. dimethyl ether, diethyl ether, methyl ethyl ether), ketone-based solvent (e.g. methyl ethyl ketone), alcohol-based solvent (e.g. methanol, ethanol) and the like. Those paints for forming a coating film are applied to the exterior of the body of a golf ball in a usual manner.

According to the present invention, the body of a golf ball may be constituted of a thread-wound golf ball or solid golf ball of multi-layer type such as one-piece golf ball, two-piece golf ball and the like.

According to the present invention, although any of enamel paint and clear paint may be employed as the paint for forming a coating film, it is just required that the outermost layer of the coating film formed on a golf ball body is a coating film having the structure of the present invention. For example, if white enamel paint is applied to the body of a golf ball and thereafter clear paint is applied thereto, the enamel paint may have a normal structure and the clear paint may be of the structure of the present invention containing the modified polysiloxane as described above. Alternatively, both of the enamel paint and clear paint may be of the structure of the present invention.

If one layer of clear paint is applied to the body of a golf ball, this clear paint may be of the structure of the present invention. If a first layer of clear paint is applied to the body of a golf ball and thereafter a second layer of clear paint is further applied thereto, the clear paint of the first layer may have a normal structure and the clear paint of the second layer may be of the structure of the present invention.

Alternatively, both of the first and second layers of the clear paint may be the paint of the present invention.

A generally employed method may be used for applying the paint of the structure according to the present invention. Spray coating is appropriate, for example.

The golf ball according to the present invention is superior in the smoothness of the surface while maintaining the impact resistance and wear resistance of the coating film. The excellent smoothness is retained for a long period of time and resistance to contamination is remarkably improved. In addition, even if the golf ball is exposed to liquid such as water, the excellent smoothness lasts over a long period of time.

EXAMPLES

The present invention is now described in detail by using examples. It is noted that the present invention is not limited to these examples.

Examples 1–7 and Comparative Examples 1–8

A one-piece golf ball was prepared which was fabricated by a usual method and to which white enamel paint is applied. On the white enamel paint, a spray coating was formed by using paint having a composition produced by adding any of modified polysiloxane components shown in Tables 1 and 2 to any of resin components which are described below as coating film composition Nos. 1 to 3. The spray coating was then dried to cure it so as to generate a clear coating film with an average thickness of 10 μm.

Coating Film Composition No. 1 (urethane resin-based paint)

"PTMG650 polytetramethylene glycol" manufactured by BASF LTD. (BASF JAPAN LTD.) was blended with trimethylol propane at a ratio of 2:1, the resultant product was diluted with solvent consisting of methyl isobutyl ketone and toluene at a ratio of 2:1 so as to contain 30% of solid component, and 0.02% of dibutyl tin laurylate was added thereto as catalyst in order to obtain a main agent. Hexamethylene diisocyanate was used as a curing agent, the main agent was mixed with the curing agent at an equivalent ratio of 1:1.2 of [NCO]/[OH] and accordingly paint was prepared.

Coating Film Composition No. 2 (acrylic resin-based paint)

"Acrydic 801" manufactured by Dainippon Ink and Chemicals, Inc. as acrylic polyol was blended with modified fatty acid of polyester polyol which is the ricinolic-modified polycondensate of phthalic acid and hexanediol at a ratio of 1:1 in order to produce a main agent. The main agent was blended with hexamethylene diisocyanate as a curing agent at an equivalent ratio of 1:1.1 and accordingly paint is prepared.

Coating Film Composition No. 3 (epoxy resin-based paint)

Bisphenol A-based resin "Epikote #1001" manufactured by Yuka Shell Epoxy K.K., polyamide resin "TXD-628" manufactured by FUJI lASEI KOGYO CO., LTD., and thinner "Polin #711 Thinner" manufactured by Shinto Paint Company, Ltd. were blended at a ratio of 1:1:0.8 by weight in order to prepare paint.

Performances of a ball were evaluated according to the method below.

Smoothness

The smoothness of a painted golf ball was evaluated by rubbing two balls to feel the degree of smoothness. The degree of smoothness was represented by ⊚, ○, Δ and x in the order of excellence.

The post-washing smoothness was evaluated after repeating a process, 10 times, of washing a golf ball with neutral detergent, then washing the ball in water, and thereafter wiping the ball with a towel. The high temp and humidity means evaluation of a washed ball which had been allowed to stand for eight hours in an oven at a temperature of 40° C. and a humidity of 90%.

Contamination Resistance

An oil marker pen (Sakura Pen Touch) was used to make any mark on the surface of a washed ball, and thereafter the mark was immediately removed by a towel. Performances were evaluated following the standards below.

○: completely removed

Δ: partially removed x: hardly removed

Wear Resistance Test

Taper wear measurement was conducted. A wearing ring CS-17 and a load of 500 g were used and it was rotated 500 times. Evaluation was made based on the resultant appearance and amount of wear. The result of the evaluation is shown in Table 1 by using symbols. The relation between the symbols and result of evaluation is as follows.

○: favorable

Δ: unfavorable x: highly unfavorable

Impact Resistance Test

A golf ball was bounced against an impact plate made of iron having face grooves at a ball speed of 45 m/s, and crack resistance as well as adhesiveness of a face mark and paint of the ball were observed. The result of evaluation is represented by symbols in Table 1. The relation between the symbols and evaluation result is as follows.

○: favorable

Δ: unfavorable x: highly unfavorable

TABLE 1

|  | Example | | | | | Comparative Example | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Coating Film Composition No. | 1 | 1 | 1 | 1 | 1 | 1 | 1 | 1 | 1 | 1 | 1 |
| Silaplane FM-DA11 (wt %)*1 | 1.0 | 5.0 |  |  |  | 0.05 | 15.0 |  |  |  |  |
| Silaplane FM-DA21 (wt %)*2 |  |  | 1.0 |  |  |  |  |  |  |  |  |
| Silaplane FM-0411 (wt %)*3 |  |  |  | 1.0 |  |  |  |  |  |  |  |

TABLE 1-continued

|  | Example | | | | | Comparative Example | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Silaplane FM-0611 (wt %)*4) |  |  |  |  | 1.0 |  |  |  |  |  |  |
| Silaplane FM-4411 (wt %)*5) |  |  |  |  |  |  | 1.0 |  |  |  |  |
| ByK-370*6) |  |  |  |  |  |  |  | 1.0 |  |  |  |
| BFKA-86*7) |  |  |  |  |  |  |  |  | 1.0 |  |  |
| Smoothness |  |  |  |  |  |  |  |  |  |  |  |
| 1) Pre-Wash | ⊚ | ⊚ | ⊚ | ⊚ | ⊚ | Δ | ⊚ | ⊚ | ⊚ | ⊚ | x |
| 2) Post-Wash | ⊚ | ⊚ | ⊚ | ○ | ○ | x | Δ | Δ | Δ | Δ | x |
| 3) High Temp and Humidity | ○ | ○ | ○ | ○ | ○ | x | Δ | x | x | x | x |
| Contamination Resistance | ○ | ○ | ○ | ○ | ○ | x | ○ | Δ | Δ | Δ | x |
| Impact Resistance | ○ | ○ | ○ | ○ | ○ | ○ | Δ | Δ | ○ | ○ | ○ |
| Wear Resistance | ○ | ○ | ○ | ○ | ○ | ○ | x | Δ | ○ | ○ | ○ |

*1)modified polysiloxane containing at least one hydroxyl group in one end (molecular weight 1000) manufactured by CHISSO CORPORATION
*2)modified polysiloxane containing at least one hydroxyl group in one end (molecular weight 5000) manufactured by CHISSO CORPORATION
*3)modified polysiloxane containing at least one hydroxyl group in one end (molecular weight 1000) manufactured by CHISSO CORPORATION
*4)modified polysiloxane containing at least one carboxyl group in one end (molecular weight 1000) manufactured by CHISSO CORPORATION
*5)modified polysiloxane containing hydroxyl groups in both ends (molecular weight 1000) manufactured by CHISSO CORPORATION
*6)polyester modified polysiloxane Byk-370 (trade name) containing at least one hydroxyl group in a side chain manufactured by BYK CHEMIE JAPAN K.K.
*7)polysiloxane BFKA-86 (trade name) containing at least one isocyanate group manufactured by BFKA CHEMICALS
*8)basic structure of Silaplane FMDA Series (trade name)

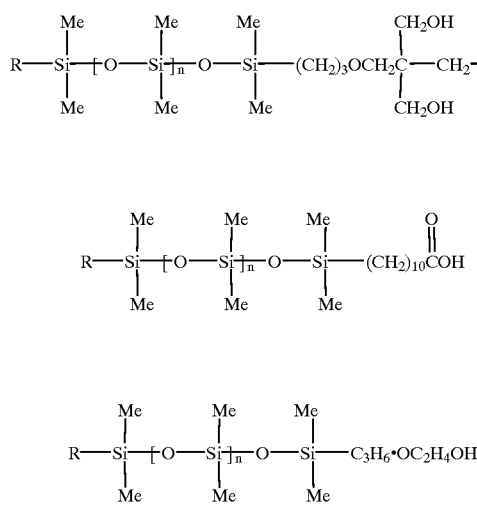

TABLE 2

|  | Example | | Comparative Example | |
| --- | --- | --- | --- | --- |
|  | 6 | 7 | 7 | 8 |
| Coating Film Composition No. | 2 | 3 | 2 | 3 |
| Silaplane FM-DA11 (wt %)*1) | 1.0 | 1.0 |  |  |
| Silaplane FM-DA21 (wt %)*2) |  |  |  |  |
| Silaplane FM-0411 (wt %)*3) |  |  |  |  |

TABLE 2-continued

|  | Example | | Comparative Example | |
| --- | --- | --- | --- | --- |
|  | 6 | 7 | 7 | 8 |
| Silaplane FM-0611 (wt %)*4) |  |  |  |  |
| Silaplane FM-4411 (wt %)*5) |  |  | 1.0 | 1.0 |
| ByK-370*6) |  |  |  |  |
| BFKA-86*7) |  |  |  |  |
| Smoothness |  |  |  |  |
| 1) Pre-Wash | ⊚ | ⊚ | ⊚ | ⊚ |
| 2) Post-Wash | ⊚ | ⊚ | Δ | Δ |
| 3) High Temp and Humidity | ○ | ○ | x | x |
| Contamination Resistance | ○ | ○ | Δ | x |
| Impact Resistance | ○ | ○ | ○ | Δ |
| Wear Resistance | ○ | ○ | ○ | x |

*1)modified polysiloxane containing at least one hydroxyl group in one end (molecular weight 1000) manufactured by CHISSO CORPORATION
*2)modified polysiloxane containing at least one hydroxyl group in one end (molecular weight 5000) manufactured by CHISSO CORPORATION
*3)modified polysiloxane containing at least one hydroxyl group in one end (molecular weight 1000) manufactured by CHISSO CORPORATION
*4)modified polysiloxane containing at least one carboxyl group in one end (molecular weight 1000) manufactured by CHISSO CORPORATION
*5)modified polysiloxane containing hydroxyl groups in both ends (molecular weight 1000) manufactured by CHISSO CORPORATION
*6)polyester modified polysiloxane Byk-370 (trade name) containing at least one hydroxyl group in a side chain manufactured by BYK CHEMIE JAPAN K.K.
*7)polysiloxane EFKA-86 (trade name) containing at least one isocyanate group manufactured by BFKA CHEMICALS From Table 1 and Table 2, it can be understood Examples 1 to 7 according to the present invention achieve improved smoothness and contamination resistance while maintaining impact resistance and wear resistance.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A painted golf ball constituted of a golf ball body and a coating film applied onto the body, said coating film is formed of a paint, wherein said paint is selected from the group consisting essentially of an urethane resin-based paint, an acrylic resin-based paint and an epoxy resin-based paint, said paint containing modified polysiloxane at a ratio of 0.6 to 10 percent by weight relative to a resin component of the paint, said modified polysiloxane having a molecular weight of 700 to 7000, and said modified polysiloxane is represented by the following formula

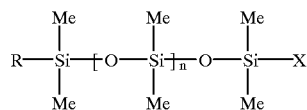

where n represents an integer, R represents an alkyl group, Me represents a methyl group, and X represents an alkyl group having at least one moiety selected from the group consisting of hydroxyl, carboxyl, ether and ester, and wherein X must have at least one hydroxyl or at least one carboxyl moiety.

2. The painted golf ball according to claim 1, wherein said coating film is formed of urethane resin-based paint.

3. The painted golf ball according to claim 1, wherein said paint containing modified polysiloxane at a ratio of 0.6 to 3.0 percent by weight relative to a resin component of the paint.

4. A painted golf ball constituted of a golf ball body and a coating film applied onto the body, said coating film is formed of a paint, wherein said paint is selected from the group consisting essentially of an urethane resin-based paint, an acrylic resin-based paint and an epoxy resin-based paint, said paint containing modified polysiloxane at a ratio of 0.1 to 10 percent by weight relative to a resin component of the paint, said modified polysiloxane having at least one group selected from the group consisting essentially of a hydroxyl group and a carboxyl group an one end of a polysiloxane chain, said modified polysiloxane having a molecular weight of 700 to 7000, wherein said modified polysiloxane has two hydroxyl groups in one end of a polysiloxane chain.

5. The painted golf ball according to claim 1, wherein the number of hydroxyl groups or carboxyl groups is 2 to 3.

6. The painted golf ball according to claim 1, wherein X represents an alkyl group having at least one moiety selected from the group consisting of carboxyl and ester.

7. The painted golf ball according to claim 1, wherein the urethane resin-based paint is a two component paint produced by blending a polyol component with a polyisocyanate component.

8. The painted golf ball according to claim 7 wherein the polyisocyanate component is selected from the group consisting of HDI (hexamethylene diisocyanate, TDI (tolylene diisocyanate), IPDI (isoporone diisocyanate), LDI (lysine diisocyanate), LTI (lysine triisocyanate), $H_{12}MDI$ (hydrogenated 4,4'-diphenylmethane diisocyanate), $H_6XDI$ (hydrogenated xylene diisocyanate), adducts, biurets and isocyanurated resin thereof.

9. The painted golf ball according to claim 7, wherein the acrylic resin-based paint is a two component paint formed of an acrylic-based polyol component having a main chain of acrylic acid and acrylate or methacrylic acid and methacrylate and isocyanate component selected from the group consisting of HDI (hexamethylene diisocyanate, TDI (tolylene diisocyanate), IPDI (isophorone diisocyante), LDI (lysine diisocyanate), LTI (lysine triisocyanate), $H_{12}MDI$ (hydrogenated 4,4'-diphenylmethane diisocyante), $H_6XDI$ (hydrogenated xylene diisocyante), adducts, biurets and isocyanurated resin thereof.

10. A painted golf ball constituted of a golf ball body and a coating film applied onto the body, said coating film is formed of a paint, wherein said paint is selected from the group consisting essentially of an urethane resin-based paint, an acrylic resin-based paint and an epoxy resin-based paint, said paint containing modified polysiloxane at a ratio of 0.1 to 10 percent by weight relative to a resin component of the paint, said modified polysiloxane having at least one group selected from the group consisting essentially of a hydroxyl group and a carboxyl group in one end of a polysiloxane chain, and said modified polysiloxane having a molecular weight of 700 to 7000, and wherein the number of hydroxyl groups or carboxyl groups is 2 to 3.

11. A painted golf ball constituted of a golf ball body and a coating film applied onto the body, said coating film is formed of a paint, wherein said paint is selected from the group consisting essentially of an urethane resin-based paint, an acrylic resin-based paint and an epoxy resin-based paint, said paint containing modified polysiloxane at a ratio of 0.1 to 10 percent by weight relative to a resin component of the paint, said modified polysiloxane having at least one group selected from the group consisting essentially of a hydroxyl group and a carboxyl group in one end of a polysiloxane chain, and said modified polysiloxane having a molecular weight of 700 to 7000, wherein when the paint is an urethane resin based paint, the urethane resin-based paint is a two component paint produced by blending a polyol component with a polyisocyanate component, and wherein when the paint is an acrylic resin-based paint, the acrylic resin-based paint is a two component paint formed of an acrylic-based polyol component having a main chain of acrylic acid and acrylate or methacrylic acid and methacrylate and an isocyanate component selected from the group consisting of HDI (hexamethylene diisocyanate, TDI (tolylene diisocyanate), IPDI (isophorone diisocyanate), LDI (lysine diisocyanate), LTI (lysine triisocyanate), $H_{12}MDI$ (hydrogenated 4,4'-diphenylmethane diisocyanate), $H_6XDI$ (hydrogenated xylene diisocyanate), adducts, biurets and isocyanurated resin thereof.

* * * * *